United States Patent
Colon

(10) Patent No.: US 8,856,900 B2
(45) Date of Patent: Oct. 7, 2014

(54) METHOD FOR AUTHORISING A CONNECTION BETWEEN A COMPUTER TERMINAL AND A SOURCE SERVER

(75) Inventor: François Colon, Marseilles (FR)

(73) Assignee: Synchronoss Technologies France, Marseille (FR)

( * ) Notice: Subject to any disclaimer, the term of this patent is extended or adjusted under 35 U.S.C. 154(b) by 718 days.

(21) Appl. No.: 12/760,811

(22) Filed: Apr. 15, 2010

(65) Prior Publication Data

US 2011/0016512 A1     Jan. 20, 2011

(30) Foreign Application Priority Data

Apr. 16, 2009     (FR) ...................... 09 01850

(51) Int. Cl.

| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04L 9/08 | (2006.01) | |
| G06T 1/00 | (2006.01) | |
| G06F 9/00 | (2006.01) | |
| G06F 17/00 | (2006.01) | |
| H04L 9/32 | (2006.01) | |
| G06F 21/00 | (2013.01) | |
| G06K 9/00 | (2006.01) | |
| H04N 1/32 | (2006.01) | |

(52) U.S. Cl.
CPC ........... *H04L 63/083* (2013.01); *H04L 63/0281* (2013.01); *H04N 1/32272* (2013.01); *H04L 2209/80* (2013.01); *H04L 9/3228* (2013.01); *H04L 9/0861* (2013.01); *H04L 2209/16* (2013.01); *G06T 1/0021* (2013.01); *H04L 9/3226* (2013.01)
USPC ...... 726/7; 726/5; 726/12; 713/153; 713/168; 713/176; 713/184; 382/100

(58) Field of Classification Search
CPC .......... H04N 1/32144; H04N 1/32267; H04N 1/32272; H04N 1/4413; H04N 2201/3233; H04N 2201/3236; H04N 2201/3261–2201/3267; H04N 2201/328; H04N 2201/3281; H04L 63/06; H04L 63/061; H04L 63/067; H04L 63/083; H04L 63/0838; H04L 9/0861; H04L 9/0863; H04L 9/32; H04L 9/3226; H04L 9/3228
USPC .............. 380/100, 284; 713/2, 153, 168, 179, 713/184, 185, 176; 726/5, 11, 12, 7; 382/100

See application file for complete search history.

(56) References Cited

U.S. PATENT DOCUMENTS

| | | |
|---|---|---|
| 4,918,588 A | 4/1990 | Barrett et al. |
| 5,870,605 A | 2/1999 | Bracho et al. |
| 5,991,407 A | 11/1999 | Murto |
| 6,377,691 B1 | 4/2002 | Swift et al. |
| 6,434,600 B2 | 8/2002 | Waite et al. |
| 6,504,480 B1 | 1/2003 | Magnuson et al. |
| 6,816,970 B2 * | 11/2004 | Morgan et al. ................. 713/183 |
| 6,912,658 B1 * | 6/2005 | Glogau et al. ................. 713/176 |
| 7,032,030 B1 | 4/2006 | Codignotto |
| 7,039,189 B1 | 5/2006 | Kienzle et al. |
| 7,155,607 B2 | 12/2006 | Yokota et al. |
| 7,350,076 B1 * | 3/2008 | Young et al. ................... 713/169 |
| 7,353,016 B2 | 4/2008 | Roundtree et al. |
| 7,389,324 B2 | 6/2008 | Masonis et al. |
| 7,522,728 B1 | 4/2009 | Rhoads |
| 7,527,728 B2 | 5/2009 | Jackson |
| 7,619,584 B2 | 11/2009 | Wolf |
| 7,685,236 B1 | 3/2010 | Harik et al. |
| 7,698,370 B1 | 4/2010 | Hall |
| 7,995,506 B2 | 8/2011 | Kalish |
| 8,090,945 B2 * | 1/2012 | Singhal .......................... 713/168 |
| 8,095,658 B2 | 1/2012 | Ashley et al. |
| 8,099,770 B2 * | 1/2012 | Makkinejad ...................... 726/9 |
| 8,196,186 B2 * | 6/2012 | Mityagin et al. .................. 726/4 |
| 2001/0013050 A1 | 8/2001 | Shah |
| 2001/0014868 A1 | 8/2001 | Herz et al. |
| 2002/0010746 A1 | 1/2002 | Jilk et al. |
| 2003/0054810 A1 | 3/2003 | Chen et al. |
| 2003/0073440 A1 | 4/2003 | Mukherjee et al. |
| 2003/0105873 A1 | 6/2003 | Ye et al. |
| 2003/0208557 A1 | 11/2003 | Higbee et al. |
| 2003/0225843 A1 | 12/2003 | Sakata |

| | | | | | | |
|---|---|---|---|---|---|---|
| 2003/0232618 | A1 | 12/2003 | Le et al. | 2010/0293376 A1 | 11/2010 | Colon |
| 2004/0052238 | A1 | 3/2004 | Borella et al. | 2011/0001603 A1 | 1/2011 | Willis |
| 2004/0056901 | A1 | 3/2004 | March et al. | 2011/0016512 A1 | 1/2011 | Colon |
| 2004/0086100 | A1 | 5/2004 | Moore et al. | | | |
| 2004/0143632 | A1 | 7/2004 | McCarty | | | |
| 2004/0143633 | A1 | 7/2004 | McCarty | | | |
| 2004/0172455 | A1 | 9/2004 | Green et al. | | | |
| 2004/0177119 | A1 | 9/2004 | Mason et al. | | | |
| 2004/0266402 | A1 | 12/2004 | Schavitz | | | |
| 2005/0021526 | A1 | 1/2005 | Bazot et al. | | | |
| 2005/0030913 | A1 | 2/2005 | Roy | | | |
| 2005/0044152 | A1 | 2/2005 | Hardy et al. | | | |
| 2005/0055443 | A1 | 3/2005 | Tosey et al. | | | |
| 2005/0080864 | A1 | 4/2005 | Daniell | | | |
| 2005/0120077 | A1 | 6/2005 | Albornoz et al. | | | |
| 2005/0144587 | A1 | 6/2005 | Bryant | | | |
| 2005/0198173 | A1 | 9/2005 | Evans | | | |
| 2005/0205660 | A1 | 9/2005 | Munte | | | |
| 2005/0243854 | A1 | 11/2005 | Ward | | | |
| 2005/0267980 | A1 | 12/2005 | Warren et al. | | | |
| 2005/0273843 | A1 | 12/2005 | Shigeeda | | | |
| 2005/0289180 | A1 | 12/2005 | Pabla et al. | | | |
| 2006/0009243 | A1 | 1/2006 | Dahan et al. | | | |
| 2006/0014530 | A1 | 1/2006 | Denenberg et al. | | | |
| 2006/0085355 | A1 | 4/2006 | Coley et al. | | | |
| 2006/0129643 | A1 | 6/2006 | Nielson et al. | | | |
| 2006/0142880 | A1 | 6/2006 | Deen et al. | | | |
| 2006/0168037 | A1 | 7/2006 | Audu et al. | | | |
| 2006/0194596 | A1 | 8/2006 | Deng | | | |
| 2006/0195506 | A1 | 8/2006 | Deng | | | |
| 2006/0218234 | A1 | 9/2006 | Deng et al. | | | |
| 2006/0240824 | A1 | 10/2006 | Henderson et al. | | | |
| 2006/0259632 | A1 | 11/2006 | Crawford et al. | | | |
| 2006/0265510 | A1 | 11/2006 | Warren et al. | | | |
| 2006/0271859 | A1 | 11/2006 | Gorzela | | | |
| 2007/0038974 | A1 | 2/2007 | Albahari et al. | | | |
| 2007/0042754 | A1 | 2/2007 | Bajikar et al. | | | |
| 2007/0130277 | A1 | 6/2007 | Roskind et al. | | | |
| 2007/0136814 | A1 | 6/2007 | Lee et al. | | | |
| 2007/0174810 | A1 | 7/2007 | Hockenberry et al. | | | |
| 2007/0192410 | A1 | 8/2007 | Liversidge et al. | | | |
| 2007/0233859 | A1 | 10/2007 | Zhao et al. | | | |
| 2007/0239866 | A1 | 10/2007 | Cox et al. | | | |
| 2007/0250496 | A1 | 10/2007 | Halliday et al. | | | |
| 2007/0253340 | A1 | 11/2007 | Varney et al. | | | |
| 2007/0266076 | A1 | 11/2007 | Cox et al. | | | |
| 2007/0282963 | A1 | 12/2007 | Mo et al. | | | |
| 2008/0040443 | A1 | 2/2008 | Agrawal | | | |
| 2008/0120387 | A1 | 5/2008 | Werndorfer et al. | | | |
| 2008/0126492 | A1 | 5/2008 | Guidi et al. | | | |
| 2008/0133674 | A1 | 6/2008 | Knauerhase et al. | | | |
| 2008/0134295 | A1 | 6/2008 | Bailey et al. | | | |
| 2008/0177878 | A1 | 7/2008 | Pierce | | | |
| 2008/0183846 | A1 | 7/2008 | Colon | | | |
| 2008/0235798 | A1 | 9/2008 | Lu | | | |
| 2008/0244014 | A1 | 10/2008 | Britton et al. | | | |
| 2008/0267091 | A1 | 10/2008 | Parkkinen et al. | | | |
| 2008/0288649 | A1 | 11/2008 | Burckart et al. | | | |
| 2008/0299953 | A1 | 12/2008 | Rao | | | |
| 2009/0031244 | A1 | 1/2009 | Brezina et al. | | | |
| 2009/0068989 | A1 | 3/2009 | Colon | | | |
| 2009/0083732 | A1 | 3/2009 | Shen et al. | | | |
| 2009/0112988 | A1 | 4/2009 | Colon | | | |
| 2009/0113007 | A1 | 4/2009 | Colon | | | |
| 2009/0125591 | A1 | 5/2009 | Kirkpatrick | | | |
| 2009/0176498 | A1 | 7/2009 | Colon | | | |
| 2009/0187634 | A1 | 7/2009 | Colon | | | |
| 2009/0210507 | A1 | 8/2009 | Haverkos | | | |
| 2010/0055659 | A1 | 3/2010 | Rogers et al. | | | |
| 2010/0057732 | A1 | 3/2010 | O'Sullivan et al. | | | |
| 2010/0077018 | A1 | 3/2010 | Acharya et al. | | | |
| 2010/0179982 | A1 | 7/2010 | Colon | | | |
| 2010/0199340 | A1 | 8/2010 | Jonas et al. | | | |
| 2010/0217809 | A1 | 8/2010 | Vymenets et al. | | | |
| 2010/0228790 | A1 | 9/2010 | Colon | | | |

FOREIGN PATENT DOCUMENTS

| | | |
|---|---|---|
| EP | 0915590 A2 | 5/1999 |
| EP | 1587239 A1 | 10/2005 |
| EP | 1643744 A1 | 4/2006 |
| EP | 2053806 A1 | 4/2009 |
| FR | 2868177 A1 | 9/2005 |
| WO | WO-2004/059447 A2 | 7/2004 |
| WO | WO-2006/084183 A1 | 8/2006 |

OTHER PUBLICATIONS

Cheddad, Abbas et al.; "Digital Image Steganography: Survey and Analysis of Current Methods;" Signal Processing, Elsevier Science, vol. 90, No. 3, Publishers B.V. Amsterdam, NL, XP026748102, ISSN: 0165-1684, Sep. 6, 2009; pp. 727-752.
European Search Report EP07291423, dated Mar. 31, 2008.
French Search Report for Application No. FR 0706244, dated Feb. 19, 2008.
French Search Report for Application No. FR 0850285, dated Sep. 15, 2008.
Kalika, Gabrielle; www.mobilemarketer.com; "Miyowa launches mobile social networking application;" Aug. 11, 2008; 2 pgs.
Ngo, Dong; http://news.cnet.com; "Miyowa's InTouch5: Cell phone contact evolved;" Aug. 5, 2008; 2 pgs.
Preliminary Search Report for French Application 0901849, dated Feb. 19, 2010.
Radek Kantor; "IV054—Chapter 13: Steganography and Watermarking;" Extract from the Internet, XP002569385, Oct. 17, 2003; 17 sheets of 34 slides.
Rishi, Late et al; "Presence and Its Effect on Network;" Personal Wireless Communications, ICPWC 2005, 2005 IEEE International Conference on New Delhi, India, Jan. 23-25, 2005, Piscataway, New Jersey; XP010798582, Jan. 23, 2005; pp. 368-372.
www.miyowa.com; "Miyowa launches MoveMessenger;" Jul. 25, 2006; 2 pgs.

* cited by examiner

*Primary Examiner* — Evans Desrosiers
*Assistant Examiner* — Daniel Potratz
(74) *Attorney, Agent, or Firm* — Haverstock & Owens LLP

(57) ABSTRACT

The disclosure relates to a method and a system for authorising a connection between a computer terminal and a source server, including an initialization phase wherein:
    the terminal connects to a gateway server,
    the gateway server sends a secret key to the terminal,
    the terminal hides the password in a data file by applying an encryption algorithm bootstrapped by the secret key, then deletes the secret key and the password,
and a connection phase wherein:
    the terminal sends the data file containing the password to the gateway server,
    the gateway server extracts the files password by executing a reverse encryption algorithm bootstrapped by the secret key, and sends the password to the source server without saving it,
    the source server analysis the received password and authorizes the connection with the terminal if the password is authenticated.

8 Claims, 7 Drawing Sheets

METHOD FOR AUTHORISING A CONNECTION BETWEEN A COMPUTER TERMINAL AND A SOURCE SERVER

CROSS-REFERENCE TO RELATED APPLICATIONS

This application claims the benefit and priority of French Application 09/01850, filed on Apr. 16, 2009, which is incorporated by reference herein.

TECHNICAL FIELD OF THE INVENTION

This invention relates to a method and a system for authorising a connection between a computer terminal and a source server. The invention relates to the general technical field of protocols for protecting the authentication of a computer terminal from a source server. The invention is preferably, but not exclusively, used for authenticating a user for: opening an instant messaging session on mobile telephone, activating the functions on a mobile or fixed line terminal, sending data on a secure communication network (requiring the use of chip cards), etc.

BACKGROUND

Computer terminals (such as mobile telephones, laptops, PDAs, BlackBerry®, etc.) are generally equipped with some functions that are used, for example, to check mails, open an instant messaging session, communicate on a Blog, send secure data, etc. Each of these functions is implemented by a specific computer application (or software) integrated in the computer terminal. When a user wants, for example, to connect to an instant messaging service, the computer application of his/her terminal sends a request asking the server to make a connection.

A trivial authentication technique is known wherein, in order to authorize a connection and activate a function, the computer terminal must first send a password directly to the source server or to a gateway server (better known to the persons skilled in the art as "Gateway") placed between said terminal and said remote server. "Password" with regard to this invention means a secret code possibly associated to the user's identifier. If the password is first sent to the gateway server, the latter analysis said password and, if authenticated, authorizes the connection. Once the connection is made between the computer terminal and the gateway server, the latter connects to the source server such that the information going to or coming from said terminal transits through said gateway server.

If the password is directly sent to the source server, the latter checks the received password and, if the password is authenticated, authorizes the connection with the terminal. As of date, the passwords are generally saved in the computer terminals and in the remote servers or in the gateway servers. The major inconvenience associated with this situation is that a fraudor can easily enter a computer terminal and steal a user's password in order to impersonate him. While the remote servers can generally be hacked with difficulty, the same is not true with the gateway servers. The latter are substantially less protected than the remote servers and in case of an attack, a fraudor can steal all the user passwords in order to impersonate any one of them.

The main technical problem that the invention aims to solve is to improve the safety of connection authorisation procedures between a computer terminal and a source server.

SUMMARY OF THE INVENTION

The invention aims to rectify the problems associated with the technical difficulties encountered in the authentication and identification mechanisms between a computer terminal and a source server. More specifically, the purpose of the invention is a method for authorising a connection between a computer terminal and a source server, wherein said method is of the type known in the prior art, i.e. wherein:
the terminal sends a password to the source server,
the source server checks the password to authorize the connection with the terminal.

In the first case, when the password is sent to a gateway server placed between the computer terminal and the source server, the method that is the purpose of the invention is remarkable due to the fact that in one initialization phase:
the terminal connects to a gateway server placed between said terminal and the source server,
the gateway server sends a secret key to the terminal,
the terminal hides the password in a data file by applying an encryption algorithm bootstrapped by the secret key, then deletes said secret key and the password so as to keep only said file containing said password,
and due to the fact that in a connection phase:
the terminal sends the data file containing the password to the gateway server,
the gateway server extracts the files password by executing a reverse encryption algorithm bootstrapped by the secret key, and sends said password to the source server without saving it,
the source server analysis the received password and authorizes the connection with the terminal if said password is authenticated.

In the second case, when the password is directly sent to the source server, the method that is the purpose of the invention is remarkable due to the fact that in an initialization phase:
the terminal connects to the source server,
the source server sends a secret key to the terminal,
the terminal hides the password in a data file by applying an encryption algorithm bootstrapped by the secret key, then deletes said secret key and the password so as to keep only said file containing said password,
and due to the fact that in a connection phase:
the terminal sends the data file containing the password to the source server,
the source server extracts the files password by executing a reverse encryption algorithm bootstrapped by the secret key, analysis said password and authorizes the connection with the terminal if said password is authenticated.

Both in the first and the second cases, the password is no longer stored as such in the computer terminal, but is now hidden in a file. Once the secret key and the password are deleted, the terminal keeps only one encrypted password. Thus the purpose is achieved. the password is no longer written as such in the terminal. If a fraudor enters the computer terminal, he/she/she will now find it very difficult to find the file in which the password is hidden, and even if he/she/she gets this file, he/she/she will find it almost impossible to recover said password since he/she/she will not know the secret key.

With regard to the first case, the gateway server no longer saves the user passwords and only keeps the secret key in memory. If a fraudor enters into the gateway server, he/she will no longer be able to steal the passwords. In the event of the second case, if a fraudor intercepts the file containing the password before it reaches the source server, he/she will not be able to find said password since he/she will not know the secret key.

In the first case, in order to secure the sending of the secret key during the initialization phase:

the gateway server first sends a secondary secret key to the terminal, the gateway server encrypts the secret key by using an encryption algorithm bootstrapped by the secondary key, and then sends said encrypted secret key to the terminal, the terminal extracts the secret key by executing a reverse encryption algorithm bootstrapped by the secondary key.

In the second case and in order to secure the sending of the secret key during the initialization phase:

the source server first sends a secondary secret key to the terminal, the source server encrypts the secret key by using an encryption algorithm bootstrapped by the secondary key, and then sends said encrypted secret key to the terminal, the terminal extracts the secret key by executing a reverse encryption algorithm bootstrapped by the secondary key.

In order to optimise the method according to the first or the second case, the password is hidden in a media file integrated in the terminal by applying a steganography algorithm. The invention also relates to systems for implementing the method that is the object of the invention, according to the first or the second case. The computer terminal is preferably a mobile telephone and the source server is an instant messaging community server.

BRIEF DESCRIPTION OF THE FIGURES

Further advantages and characteristics of the invention will appear more clearly from reading the description of a preferred embodiment, with reference to the appended drawings, made as indicative and non exhaustive examples, and in which.

For more clarity, the identical or similar elements are marked by identical reference signs on all the figures.

DETAILED DESCRIPTION OF AN EMBODIMENT

The method that is the object of the invention is used to protect the authentication of a computer terminal from a source server for making a connection between said terminal and said source server. This method is preferably, but not exclusively, used for authenticating a user for: opening an instant messaging session on mobile telephone, activating the functions on a mobile or fixed line terminal, sending data on a secure communication network (requiring the use of chip cards), etc.

The computer terminal T used for implementing the invention can be a mobile terminal such as a mobile telephone, a device of the Personal Digital Assistant (PDA) type, a device of the BlackBerry® type, or a fixed terminal such as a desktop personal computer. As is well known to the persons skilled in the art, the terminal T is equipped with a processor, which is configured to execute one or more programmes, sub-programmes, micro-programmes or any other types of equivalent software, in order to manage the various stages of the authentication protocol that will be described in detail in the rest of the description. The terminal T also integrates some computer applications (programmes, sub-programmes, microprogrammes, . . . ) that enables it to implement the various functions integrated in: mails, blog, instant messaging, secure data transfer, etc. In order to implement these functions, it is necessary for the user of the computer terminal T to identify itself to the source server.

The source server SS comprises a computer or a computer programme configured to provide some functions (mails, blog, etc.) and especially instant messaging services, to a terminal T that connects thereto. The source server SS is preferably associated to different instant messaging communities. It is connected to a communication network (MSM®, Jabber®, Yahoo!®, or other) usually used to implement the various aforementioned functions. As is well known, this source server SS integrates computer applications and is equipped with a processor, which is configured to execute one or more programmes, sub-programmes, micro-programmes or any other types of equivalent software, in order to manage the various stages of the authentication protocol that will be described in detail in the rest of the description. Referring to the appended figures, the computer terminal T must send a password PWD to the source server SS. The latter then checks the password PWD to authorize the connection with the terminal T.

Figure 1:
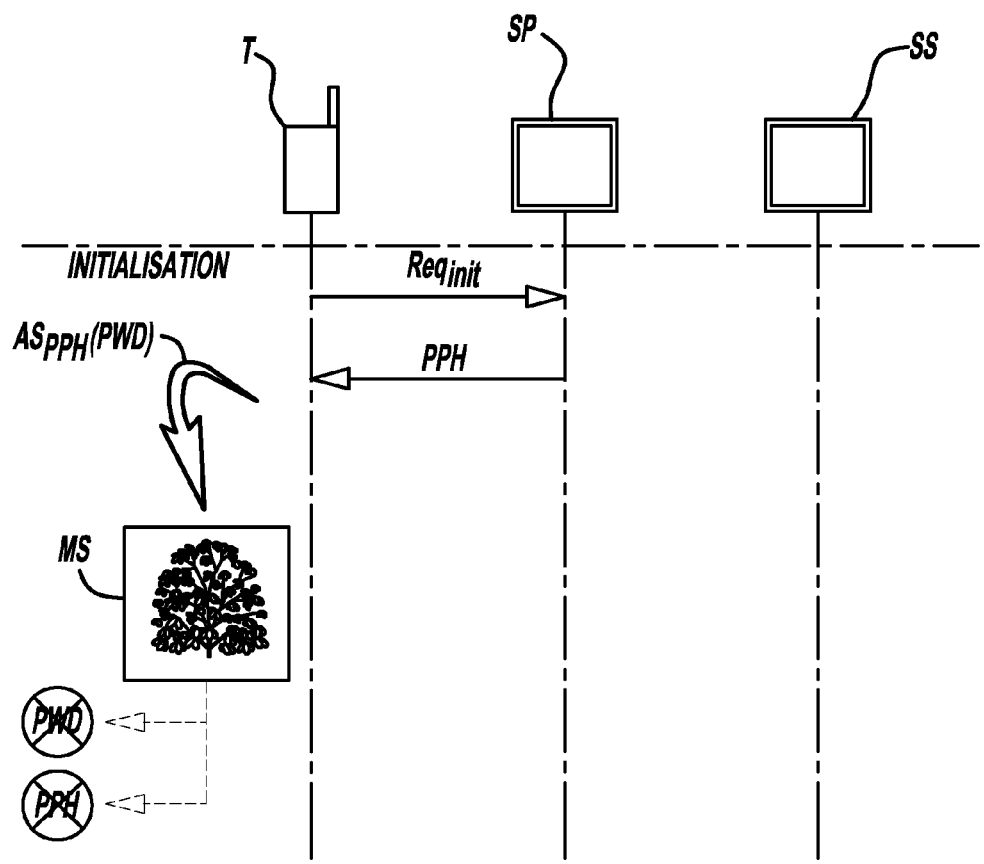
FIG. 1 illustrates the different steps of the method's initialization phase according to the invention, in the first case, when the password is first sent to a gateway server placed between the computer terminal and the source server.
Figure 2:
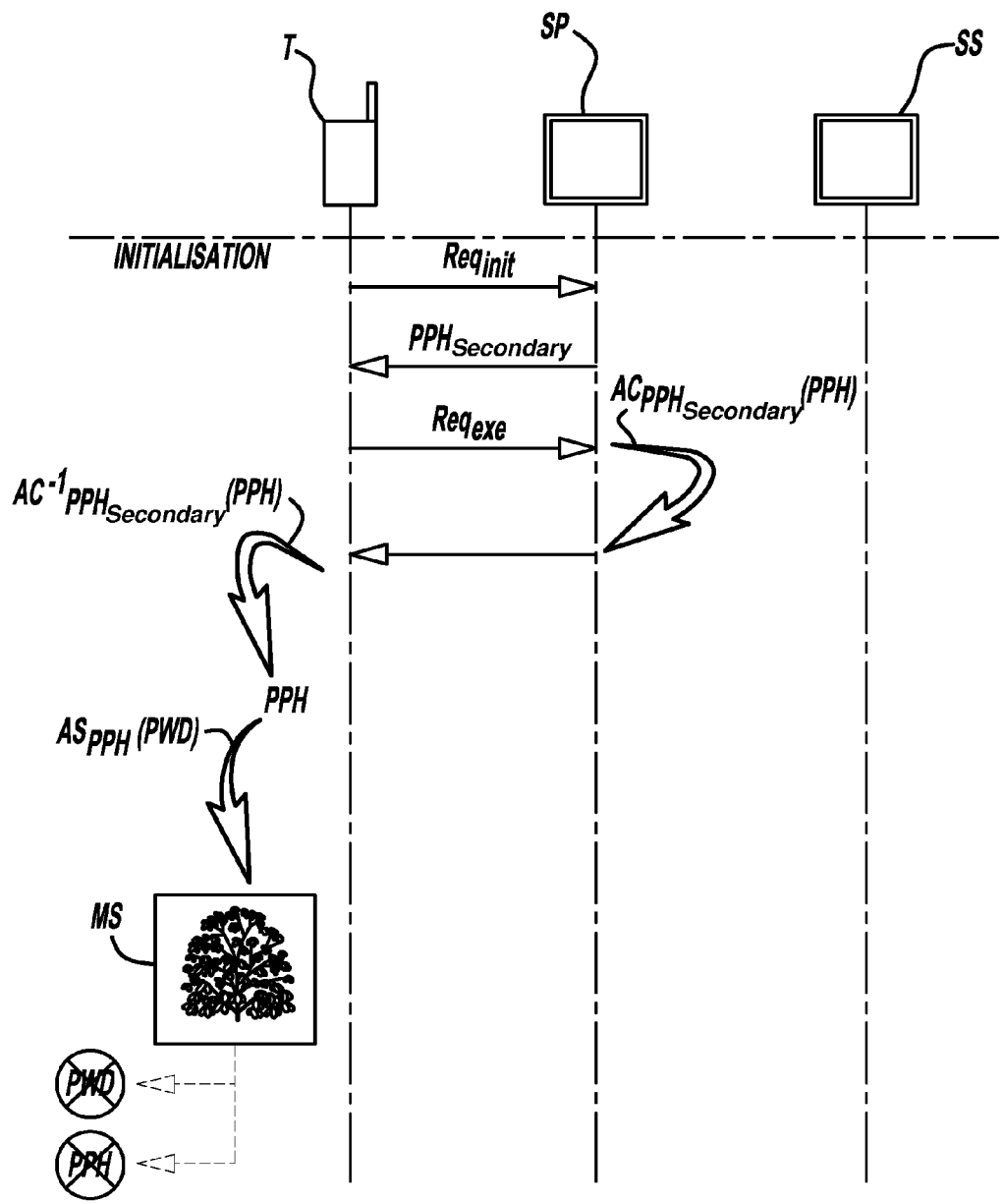
FIG. 2 illustrates the various steps of the initialization phase, based on an alternative, in the first case.

Two cases are possible:

either the password PWD is sent to a gateway server SP or "gateway" before being sent to the source server SS (FIG. 1), or the password is directly sent to the source server SS (FIG. 2).

1st Case: the Password PWD is Sent to a Gateway Server SP Before Being Sent to the Source Server SS.

Figure 3:
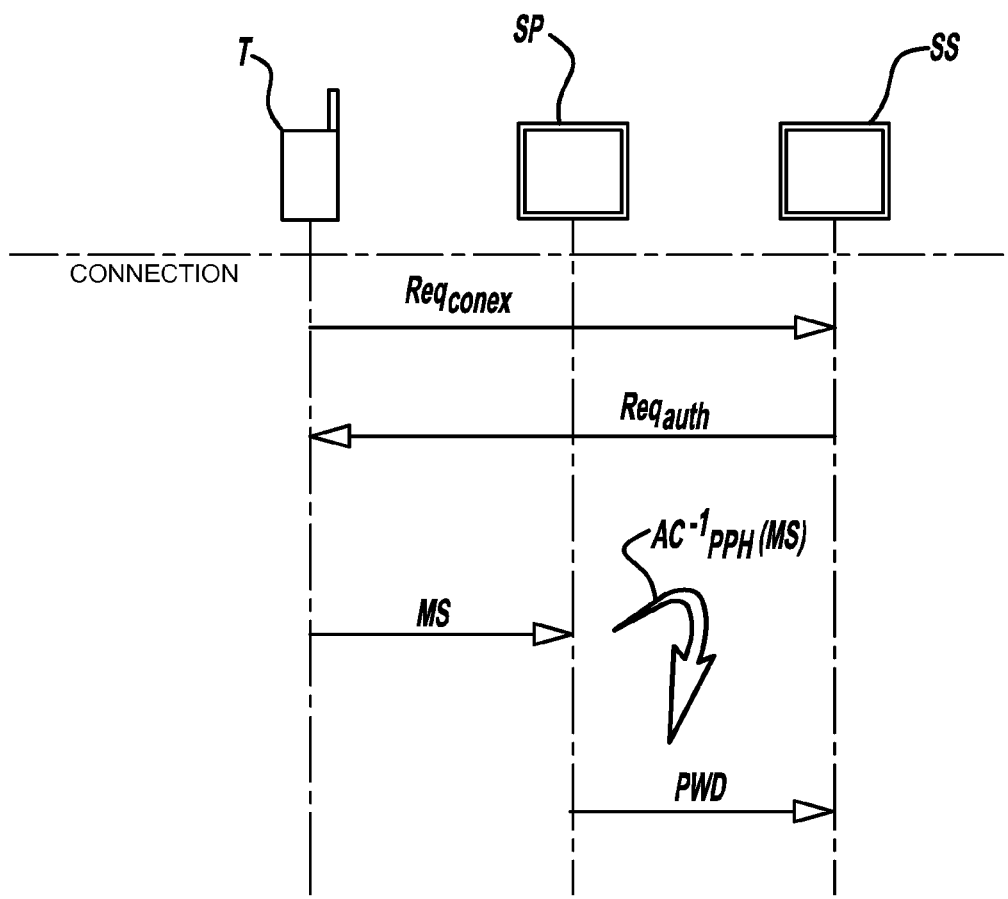
FIG. 3 illustrates the various steps of the connection phase in the first case.

Referring to FIGS. 1 to 3, a gateway server SP, whether or not different from the source server SS, is placed between said source server and the computer terminal T such that the information to or from said terminal passes through said gateway server. In practice, this gateway server SP, better known to the persons skilled in the art by the term "gateway" is a computer or a computer programme configured to provide some services to the computer terminals of users who connect thereto. The gateway server SP can especially be equipped with resources for managing an instant messaging session, filtering messages and managing the contact lists of a user. Other services such as: weather forecasting, advertising, games, audio messaging or others can also be implemented by the gateway server SP.

The latter is used to offset and/or add some functions without having to modify the source server SS. As is well known, the gateway server SP integrates the computer applications and is equipped with a processor, which is configured to execute one or more programmes, sub-programmes, micro-programmes or any other types of equivalent software, in order to manage the various stages of the authentication protocol that will be described in detail in the rest of the description.

With reference to FIG. 1, in an initialization phase the terminal T connects to the gateway server SP and sends an initialization request $Req_{init}$ to said server in order to download the resources of a computer application associated with one or more functions that the user wants to get. In response to this request, the gateway server SP can send a secret key PPH to the terminal T in addition to the application resources. The secret key PPH is specific to each user: there are as many secret keys PPH as there are users. In practice, the terminal T sends an identifier to the gateway server SP, which in return sends the secret key PPH. This identifier can, for example, be an identifier specific to each user or a code for the connection to an instant messaging community. The initialization request $Req_{init}$ and the secret key PPH transit on the transmission channel (or another channel) connecting the terminal T to the gateway server SP.

The secret key PPH, in principle, integrates a random number n. This number n is in practice a hexadecimal integer of several bits generated by a pseudo-random number generator (PNRG) integrated in the server. The secret key PPH can also integrate a time marker t. It is, for example, possible to implement the marker t as a hexadecimal number that is incremented each time an initialization request $Req_{init}$ is received (thus changing with time). However, other techniques are known to the persons skilled in the art for implementing the marker t. In practice, the time marker t corresponds to the date of creation of the random number n. The number n and the marker t are used to increase the entropy (difficulty of falsification) of the secret key PPH.

In an alternative, for which the steps are illustrated in FIG. 2, an additional secondary secret key $PPH_{Secondary}$ is used during the initialization phase. After the terminal T connects to the gateway server SP, said server generates not only the secret key PPH defined earlier, but also a secondary key. The latter is specific to each user and is in practice associated to each of the users' identifiers. The secondary secret key $PPH_{Secondary}$ in principle consists of a hexadecimal integer of several bits. The secret key PPH as well as the secondary secret key $PPH_{Secondary}$ are then stored in a database of the gateway server SP. The gateway server SP then sends the secondary secret key $PPH_{Secondary}$ to the terminal T.

The secondary secret key $PPH_{Secondary}$ can, for example, be added, on the fly, in the computer application resources downloaded by the user in a specific zone known to said application. The secondary key $PPH_{Secondary}$ can be astutely hidden in the compiled code of the computer application. On first execution, the terminal T sends a request $Req_{exe}$ to the gateway server SP asking for the secret key PPH to said server. In response, the gateway sever SP encrypts the secret key PPH by using an encryption algorithm $AC_{PPHsecondary}$ bootstrapped with the secondary key $PPH_{Secondary}$ and then sends said encrypted secret key PPH to terminal T. For example, a RSA or DES type encryption algorithm can be used, the purpose being to get a string of binary characters in which the secret key PPH is hidden. The terminal T can then extract the secret key PPH by executing a reverse encryption algorithm $AC^{-1}_{PPHsecondary}$ bootstrapped by the secondary key $PPH_{Secondary}$. Thus the exchange of the secret key PPH is better secured.

In accordance with FIGS. 1 and 2, as soon as the terminal T gets the secret key PPH, it hides the password PWD in a data file MS by applying an encryption algorithm ASP PH advantageously bootstrapped by the secret key PPH. In order to strengthen the security of the protocol, as soon as the encryption algorithm ASP PH is executed, the terminal T deletes the secret key PPH. The encryption algorithm ASP PH is specific to each secret key PPH and thereby to each user. According to a preferred embodiment, the password PWD is hidden by steganography in a media file MS saved on the computer terminal T. Steganography is a technique that is used to hide a piece of information (the password PWD) in a media (the media file MS) such that the presence of information on the media is imperceptible (neither visually, nor audibly) and thereby not detectable by a person.

However, other encryption algorithms known to the persons skilled in the art can be used in order to hide the password PWD in any data file MS embedded in the terminal T. For example, RSA and DES encryption algorithms can be used with the purpose of getting a binary character string (file) in which the password PWD is hidden.

Figure 7:
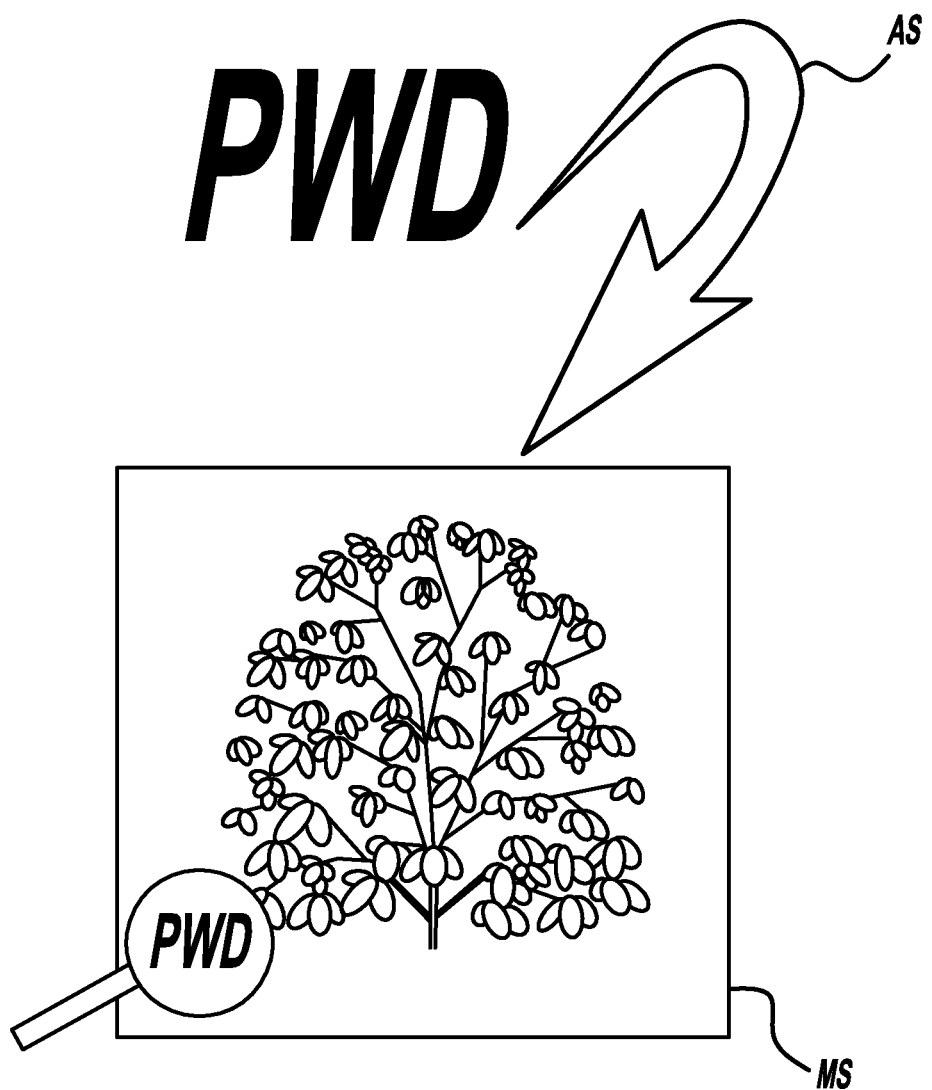
FIG. 7 illustrates the insertion of a password in an image by steganography.

In this invention, the password PWD corresponds to a secret code associated with the user identifier that can appear in the form of a hexadecimal number of several bits. The media file MS is generally a binary file that is part of the computer application's resources associated with a function embedded in the computer terminal T. In practice, it pertains to an image file (JPEG, MPEG, . . . ), an audio file (MP3, . . . ) or a video file (MPEG2, MPEG 4, . . . ). for example it can pertain to a wallpaper, an audio or video welcome message. The case where the password PWD is hidden in a JPEG or MPEG image is illustrated in FIG. 7: if the image represents a tree with leaves, the password PWD can be hidden in the pixels corresponding to one of the leaves of the tree or elsewhere, since we do not necessarily control the place where said password will be hidden.

The steganography algorithm AS used preferentially is of the type using the LSB (Least Significant Bit) technique. This algorithm consists in replacing the low-order bits of the bytes coding the light intensity of the image pixels by the bits of the secret key. By modifying a low-order bit, it is possible to slightly modify the light intensity or the shade of a pixel of the image. This slight modification is imperceptible to the human eye and not detected when all the bytes coding the light intensity of the image's pixels are analysed. For example, if the light intensity of the image pixels is coded by the bytes: 000-000-100-110-101 and if the password PWD corresponds to the number: 11111, then the modified image will be coded by the following bytes: 001-001-101-111-101. The same steganography algorithm can be used for hiding the password PWD in a video file. In an audio file, the information can be hidden in imperceptible variations of the sound coded with low significant bits 30. Naturally, any other steganography algorithm suitable to the persons skilled in the art can be used.

Once the password PWD is hidden in the file MS, the terminal T deletes the password in order to retain only said file. The latter can then be stored in a memory area of terminal T. Even if the file MS is detected by a fraudor who has illegally accessed the terminal T, he/she will practically have no chance to detect the password PWD.

With reference to FIG. 3, when the user of the terminal T wants to open a session, a computer application placed in said terminal sends a connection request $Req_{conex}$ to the gateway server SP, which sends it directly to the source server SS: this is the connection phase. Before activating the function(s), the source server SS must authenticate the terminal T. In order to do this, it sends an authentication request $Req_{auth}$ to the terminal T, via the gateway server SP The $Req_{conex}$ and $Req_{auth}$ requests the transition on the transmission channels (or other channels) connecting terminal T, the gateway server SP and the source server SS.

When the terminal T receives the authentication request Req$_{auth}$, it sends the data file MS wherein the password PWD is hidden to the gateway server SP. Therefore the password PWD does not transit as such between the terminal T and the source server SP and even if the MS file is intercepted by a fraudor, the latter will practically have no chance to detect the password PWD. After having received the file MS, the gateway server SP extracts the password PWD by executing a reverse encryption algorithm AS$^{-1}$$_{PPH}$. In practice, this reverse encryption algorithm is bootstrapped by the secret key PPH associated with the user of the terminal T. The gateway server SP thus sends the password PWD extracted from the file MS to the source server SS. The password PWD is not saved in the gateway server SP but, on the contrary, it is instantly deleted as soon as it is sent towards the source server SS.

Even if a fraudor illegally enters the gateway server SP, he/she will have no chance to detect the password PWD. The source server SS analysis the received password PWD and if said password is authenticated, it authorizes the connection with the terminal T to activate the function(s) desired by the user. If not so, an error message can be sent from the source server SS to the terminal T.

2nd Case: the Password PWD is Directly Sent to the Source Server SS.

Figure 4:
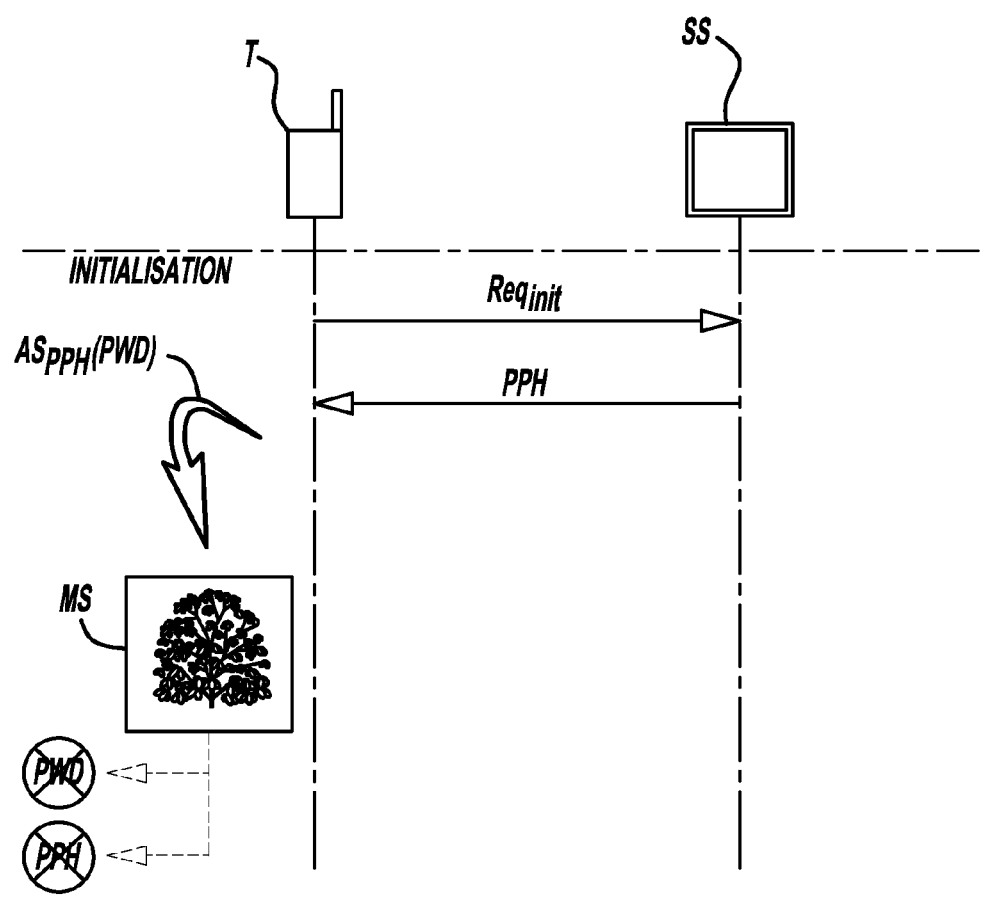
FIG. 4 illustrates the different steps of the method's initialization phase in accordance with the invention in the second case, when the password is sent directly to the source server.
Figure 5:
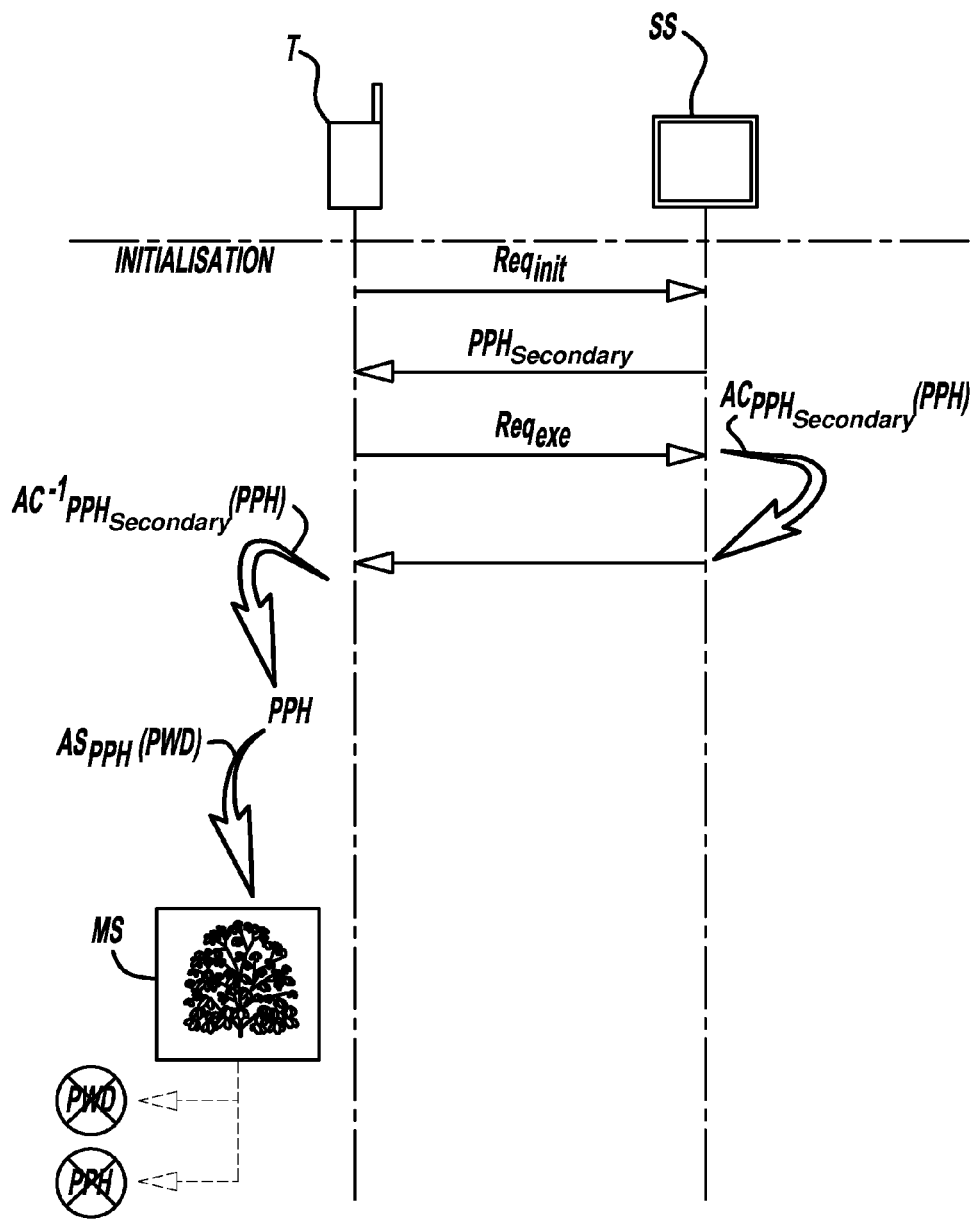
FIG. 5 illustrates the various steps of the initialization phase, based on an alternative, in the second case.
Figure 6:
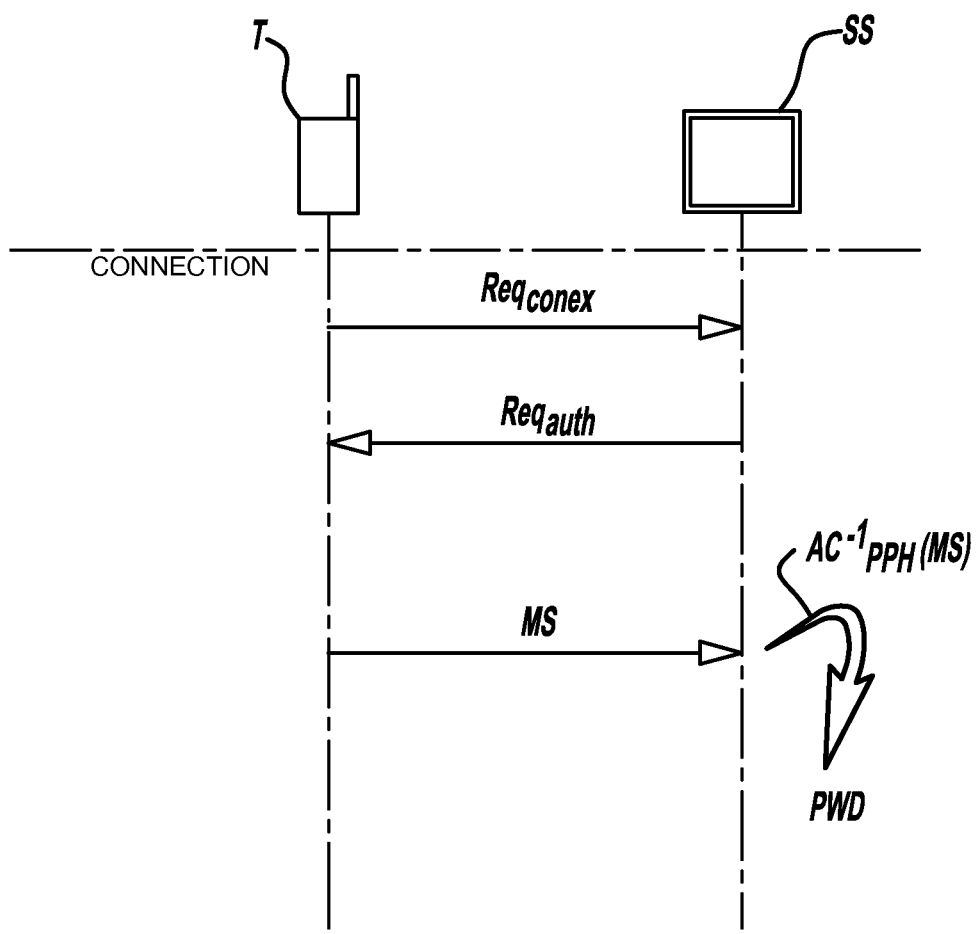
FIG. 6 illustrates the various steps of the connection phase in the second case.

Referring to FIGS. 4 to 6, the computer terminal T is in this case directly connected to the source server SS. With reference to FIG. 4, in initialization phase the terminal T connects to the source server SS by sending an initialization request Req.sub.init to the source server SS in order to download the resources of a computer application associated with one or more functions that the user wants to get. In response to this request, the source server SS can send a secret key PPH to the terminal T in addition to the application resources. This secret key PPH is identical to the one described earlier. The initialization request Req.sub.init and the secret key PPH transit on the transmission channel (or another channel) connecting the terminal T to the source server SS.

In an alternative, the steps of which are illustrated in FIG. 5, an additional secondary secret key PPH$_{Secondary}$ is used during the initialization phase. After the terminal T connects to the source server SS, said server generates not only the secret key PPH defined earlier, but also a secondary key. The latter is specific to each user and is in practice associated to each of the identifiers of the users. The secret key PPH as well as the secondary secret key PPH$_{Secondary}$ are then stored in a database of the source server SS. The source server SS then sends the secondary secret key PPH$_{Secondary}$ to the terminal T. The secondary secret key PPH$_{Secondary}$ can, for example, be added, on the fly, in the computer application resources downloaded by the user in a specific zone known to said application. The secondary key PPH$_{Secondary}$ can be astutely hidden in the compiled code of the computer application. On first execution, the terminal T sends a request Req$_{exe}$ to the source server SS asking said server for the secret key PPH. In response, the source server SS encrypts the secret key PPH by using an encryption algorithm AC$_{PPHsecondary}$ bootstrapped by the secondary key PPH$_{Secondary}$ and then sends said encrypted secret key PPH to the terminal T. For example, a RSA or DES type encryption algorithm can be used, the purpose being to get a string of binary characters wherein the secret key PPH is hidden. The terminal T can then extract the secret key PPH by executing a reverse encryption algorithm AC$^{-1}$$_{PPHsecondary}$ bootstrapped by the secondary key PPH$_{Secondary}$. Thus the exchange of the secret key PPH is better secured.

Similar to what has been described earlier concerning the first case, as soon as the terminal gets the secret key PPH, the terminal T hides the password PWD in a data file MS by applying an encryption algorithm AS$_{PPH}$ advantageously bootstrapped by the secret key PPH. This encryption algorithm AS$_{PPH}$ is identical to the one described for the first case. Once the password PWD is hidden in the datafile MS, the terminal T deletes the password in order to retain only said file. The latter can then be stored in a memory area of the terminal T.

With reference to FIG. 6, when the user of the terminal T wants to open a session, a computer application placed in said terminal sends a connection request Req$_{conex}$ to the source server SS: this is the connection phase. In turn, the source server SS sends an authentication request Req$_{auth}$ to the terminal (T). When the terminal T receives this authentication request Req$_{auth}$, it sends the data file MS wherein the password PWD is hidden to the source server SS. Therefore the password does not transit as such between the terminal T and the source server SS. After having received the file MS, the source server SS extracts the password PWD by executing a reverse encryption algorithm AS$^{-1}$$_{PPH}$, advantageously bootstrapped by the secret key PPH associated with the user of the terminal T. The source server SS analysis the received password PWD and if said password is authenticated, it authorizes the connection with the terminal T to activate the function(s) desired by the user. If not so, an error message can be sent from the source server SS to the terminal T.

What is claimed is:

1. A method for authorising a connection between a computer terminal of a user and a source server, the method comprising:
   (a) sending a password from the terminal to the source server;
   (b) checking the password with the source server to authorize the connection with the terminal;
   (c) in an initialization phase:
      (i) connecting the terminal to a gateway server placed between the terminal and the source server by sending from the terminal to the gateway server an initialization request comprising a non-random identifier;
      (ii) generating on the gateway server a secret key that is specific to the user and that comprises a random number and sending the secret key from the gateway server to the terminal;
      (iii) as soon as the terminal receives the secret key, using the terminal to hide the password in a unique multimedia file by applying a steganographic encryption algorithm bootstrapped by the secret key;
      (iv) as soon as the steganographic encryption algorithm is executed, deleting the secret key from the terminal; and
      (v) once the password is hidden in the unique multimedia file, deleting the password from the terminal and keeping only the unique multimedia file containing the password in the terminal;
   (d) in a connection phase:
      (i) sending the unique multimedia file containing the hidden password from the terminal to the gateway server;
      (ii) extracting the password from the unique multimedia file, on the gateway server, by executing a reverse encryption algorithm bootstrapped by the secret key, and sending the password from the gateway server to the source server;

(iii) immediately deleting the password from the gateway server as soon as the password is sent from the gateway server towards the source server; and (iv) using the source server to analyze the received password and authorize the connection with the terminal in response to the password being authenticated.

2. A method according to claim 1, wherein during the initialization phase:

the gateway server first sends a secondary secret key to the terminal;

the gateway server encrypts the secret key by using an encryption algorithm bootstrapped by the secondary secret key, and then sends the encrypted secret key to the terminal; and the terminal extracts the secret key by executing a reverse encryption algorithm bootstrapped by the secondary secret key.

3. A method for authorising a connection between a computer terminal of a user and a source server, the method comprising:

(a) the terminal sending a password to the source server;

(b) the source server checking the password to authorize the connection with the terminal;

(c) in an initialization phase:

(i) the terminal connecting to the source server by sending from a terminal to the source server an initialization request comprising a non-random identifier;

(ii) the source server generating a secret key that is specific to the user and that comprises a random number and sending the secret key to the terminal;

(iii) the terminal, as soon as the secret key is received, hiding the password in a unique multimedia file by applying a steganographic encryption algorithm bootstrapped by the secret key;

(iv) as soon as the steganographic encryption algorithm is executed, deleting the secret key from the terminal; and (v) once the password is hidden in the unique multimedia file, deleting the password from the terminal and keeping only the unique multimedia file containing the password in the terminal;

(d) in a connection phase:

(i) the terminal sending the unique multimedia file containing the password to the source server; and (ii) the source server extracting the password from the unique multimedia file by executing a reverse encryption algorithm bootstrapped by the secret key, analyzing the password, and authorizing connection with the terminal in response to the password being authenticated.

4. A method according to claim 3, wherein during the initialization phase:

the source server first sends a secondary secret key to the terminal;

the source server encrypts the secret key by using an encryption algorithm bootstrapped by the secondary secret key and then sends the encrypted secret key to the terminal; and the terminal extracts the secret key by executing a reverse encryption algorithm bootstrapped by the secondary secret key.

5. A system for authorising a connection between a computer terminal of a user and a source server, the system comprising:

the terminal comprising a processor configured to execute first instructions from a non-transitory computer-readable medium, the first instructions comprising a resource for sending a password to the source server;

the source server comprising a processor configured to execute second instructions from a non-transitory computer-readable medium, the second instructions comprising a resource for checking the password to authorize the connection with the terminal;

in an initialization phase:

(a) the terminal further comprising a resource for connecting to a gateway server placed between the terminal and the source server by sending from the terminal to the gateway server an initialization request comprising a non-random identifier;

(b) the gateway server further comprising a resource for generating on the gateway server a secret key that is specific to the user and that comprises a random number and sending the secret key to the terminal;

(c) the terminal further comprising a resource for hiding the password in a unique multimedia file as soon as the terminal receives the secret key, by applying a steganographic encryption algorithm bootstrapped by the secret key, and a resource for deleting the secret key as soon as the steganographic encryption algorithm is executed and deleting the password once the password is hidden in the unique multimedia file and keeping only the unique multimedia file containing the password;

in a connection phase:

(a) the terminal further comprising a resource for sending the unique multimedia file containing the password to the gateway server;

(b) the gateway server further comprising a resource for extracting the password from the unique multimedia file by executing a reverse encryption algorithm bootstrapped by the secret key, a resource for sending the password to the source server, and a resource for immediately deleting the password from the gateway server as soon as the password is sent from the gateway server towards the source server; and (c) the source server further comprising a resource for analysing the received password and authorising the connection with the terminal in response to the password being authenticated.

6. A system for authorising a connection between a computer terminal of a user and a source server, the system comprising:

the terminal comprising a processor configured to execute first instructions from a non-transitory computer-readable medium, wherein the first instructions result in the terminal operably sending a password to the source server;

the source server comprising a processor configured to execute second instructions from a non-transitory computer-readable medium, wherein the second instructions result in the source server operably checking the password to authorize the connection with the terminal;

in an initialization phase:

(a) the terminal operably connecting to the source server by sending from the terminal to the source server an initialization request comprising a non-random identifier;

(b) the source server operably generating a secret key that is specific to the user and that comprises a random number and sending the secret key to the terminal;

(c) the terminal operably hiding the password in a unique multimedia file, as soon as the secret key is received, by applying a steganographic encryption algorithm bootstrapped by the secret key, and the terminal operably deleting the secret key as soon as the steganographic encryption algorithm is executed and deleting the password once the password is hidden in the unique multimedia file and keeping only the unique multimedia file containing the password;

in a connection phase:
(a) the terminal operably sending the unique multimedia file containing the password to the source server; and
(b) the source server operably extracting the password from the unique multimedia file by executing a reverse encryption algorithm bootstrapped by the secret key, the source server operably analysing the password and authorising connection with the terminal in response to the password being authenticated.

7. A system according to claim 6, wherein the terminal is a mobile telephone.

8. A system according to claim 6, wherein the source server is an instant messaging community server.

\* \* \* \* \*